3,188,198
METHOD FOR DEOXIDIZING METALS
Warren F. Moore, Schenectady, N.Y., assignor to General Electric Company, a corporation of New York
No Drawing. Filed Aug. 23, 1962, Ser. No. 218,826
3 Claims. (Cl. 75—57)

This invention relates to the deoxidation of iron and similar metals such as those in the iron group and particularly to the deoxidation of iron to produce highly deoxidized metal which is low in carbon and gases. As is well known, such iron possesses outstanding magnetic properties and may be used as such for the production of magnetic components of electronic devices, such as magnetic cores, or it may be used for the production of magnetic iron alloys or in the production of tool and bearing steels.

The desirability of producing highly deoxidized iron and iron alloys, with particular emphasis on low gas and carbon content, has long been recognized. Oxygen will combine with the iron to produce oxides while any carbon present will result in the formation of a pearlitic structure in the iron, both of these materials adversely affecting the magnetic as well as other electric properties of the iron. Similarly, oxide inclusions in tool and bearing steels are very detrimental to both the physical properties and the life of those steels. Therefore, it is necessary in the production of pure iron and its alloys to decrease the oxygen content to a minimum while maintaining the carbon content in a like condition.

The most widely accepted method presently used for attaining this end is the carbon deoxidation method. According to this method, a predetermined quantity of carbon is mixed with the iron in a crucible of a vacuum induction melting furnace. The furnace is evacuated and the metal is melted, the oxygen contained therein reacts with the carbon to form carbon monoxide which causes the metal to boil as the carbon monoxide leaves the metal. A degree of control over the carbon boil is achieved by admitting a static partial pressure of argon to the chamber if necessary, or by allowing a build-up in pressure of the evolved gases, mainly carbon monoxide. As the boil subsides, the pressure is gradually reduced until high vacuum conditions again exist over the melt.

The outstanding difficulties of the above-described method are fourfold. First, the degree of deoxidation which it is possible to achieve thereby without introducing an excessive amount of carbon in the resulting metal is not low enough to produce the desired properties of the metal. Second, the method in which the vacuum melting chamber is isolated from the pumps and the pressure of the evolved gas (carbon monoxide) is permitted to build up over the melt to a point at which the boil can be controlled is too slow to be of practical use in small heats. Third, the use of a static partial pressure of argon is accompanied by operational difficulty such as bridging in the crucible on meltdown, difficulty in reducing the pressure without excessive loss of metal due to splattering, and lack of means for effecting continuous removal of deoxidation products from the furnace chamber. Fourth, somewhat erratic, fairly high oxygen contents are obtained in heats melted in new crucibles.

It is the object of the present invention to overcome these difficulties. Generally, this is accomplished by using a dynamic partial pressure of hydrogen having a very low dew point for the purposes of aiding the deoxidation and carrying away the deoxidation products while controlling the carbon boil and by pretreating the new crucibles with wash metal produced by the carbon-dynamic hydrogen deoxidation method of the present invention before melting a new charge therein.

According to the present invention, the iron to be deoxidized, which is comparatively pure but contains an excessive amount of oxygen, is mixed with carbon in a crucible of a vacuum induction furnace. The crucible should be non-carbonaceous or one whose internal surface is free of carbon. Crucibles composed mainly of BeO, $ThO_2$, MgO, $Al_2O_3$, $SiO_2$ and combinations such as Mullite ($3Al_2O_3 \cdot 2SiO_2$) can be used; however, MgO crucibles are preferred. The amount of carbon mixed with the iron is sufficiently in excess of the stoichiometric amount required to react with the oxygen of the iron according to the reaction $2C+O_2 \rightarrow 2CO$ to compensate for the amount of oxygen that is introduced into the metal by the crucible and to produce as thorough a deoxidation without an undue residual amount of carbon as possible. In actual operation it has been found an excess of about 33 percent is necessary when a new washed commercial magnesia crucible is used.

The above-described mixture is melted under a subatmospheric dynamic pressure of hydrogen in a vacuum induction furnace of the type described by W. F. Moore and R. K. McKechnie in their article entitled, "Deoxidation of Vacuum Melted M—252," Vac. Met. Symposium, Electrochem. Soc., Boston, Mass. (October 6th and 7th, 1954). The pressure of the hydrogen is only sufficient to control the carbon boil and minimize the splatter. A dynamic hydrogen atmosphere flowing at the rate of 125 cubic feet per hour and at a pressure of 4 mm. of mercury, i.e., that produced by pumping hydrogen at a pressure of 4 mm. over the surface of the melt and through the chambers of the vacuum furnace, has been found to meet these requirements. As the boil subsides, upon the completion of the major portion of the deoxidation, the pressure in the furnace is gradually reduced to 100 microns or less, preferably in the range of 100 to 10 microns, and the metal is poured under a pressure range of 10 to 25 microns. In order to insure complete degasification, the metal may be alternately frozen and melted to squeeze out any entrained gas before pouring.

As indicated above, the hydrogen used should be very dry, i.e., its dew point should be very low. For the best results, its dew point should approach —100° F. However, a considerable increase in dew point, e.g., a dew point as high as —38° F., can be tolerated without seriously affecting the deoxidation practice.

As further pointed out above, somewhat erratic and fairly high oxygen contents are obtained in heats melted in new crucibles. This results from the fact that all crucibles are not exactly the same but vary greatly in their properties, particularly in their rate at which they are attacked by the molten metal and resulting difference in oxygen pick-up by the metal because of this metal crucible reaction. This is the property which is of great importance in the deoxidation process.

In an operation in which a large number of heats of the same composition are made in the same crucible, this property is important only for the first heat. The first heat produces a crucible surface substantially in equilibrium with the low oxygen product described and minimizes the oxygen pick-up of the heat. However, in operations in which almost every heat differs from the next, which are very common, new crucibles must be used whenever a different composition is melted. It is therefore important to minimize the above-described property of such crucibles.

I have achieved this end by washing the new crucibles with high purity, low oxygen iron preferably produced by the above-described method.

In a preferred embodiment of the invention, a commerical high purity magnesium oxide crucible for a vacuum induction furnace was washed with high purity iron produced according to the above-described carbon dynamic hydrogen deoxidation process. The iron used in this process was electrolytic iron containing 500 parts per million oxygen, 40 p.p.m. nitrogen and 40 p.p.m. carbon. The amount of carbon admixed with the iron was 500 p.p.m. based on the weight of the iron. A dynamic pressure of 4 mm. of mercury of hydrogen of −92° F. dew point was used in the process to control the boil and as the boil subsided, the pressure was gradually reduced to 100 microns. The metal was remelted and solidified a number of times to obtain maximum removal of gases. The iron so produced contained 97 p.p.m. oxygen, 1 p.p.m. nitrogen, less than 10 p.p.m. carbon and no hydrogen.

The crucible washed with the iron so produced was then used in the vacuum induction furnace to produce the more highly deoxidized iron having the low carbon and gas contents desired. The materials, their proportions, the dynamic hydrogen pressure, and the final pressure used in this process were exactly the same as those used in the preparation of the wash iron. The resulting highly purified iron contained 18 p.p.m. oxygen, 1 p.p.m. nitrogen, 10 p.p.m. carbon and no hydrogen.

In contradistinction, metal prepared in an unwashed crucible by a method identical with that described above, with the exception that a static pressure of argon rather than dynamic hydrogen was used for controlling the boil, contained 189 p.p.m. oxygen and 3 p.p.m. nitrogen. Considerable bridging was evident during the melt-down and there was an excessive loss of metal due to splatter.

Although the best and most consistent results are obtained by using a crucible which has been washed with the deoxidized iron of the type described, it is quite evident that useful results are obtained even when new unwashed crucibles are used because not only does this process drastically reduce the oxygen of the iron when such crucibles are used but it actually reduces the carbon and nitrogen contents as well. When using the unwashed crucibles, a greater percentage excess of carbon (>33%) may be added to obtain lower oxygen contents. However, this procedure is not subject to as accurate control of the product quality as is the process making use of the washed crucibles.

While the instant invention has been described in conjunction with the deoxidation of iron, it can and has been used successfully on Fe, Ni and Co and alloys of these three, plus alloys of these with up to 20% Cr and up to 10% of Mo or W. It is also applicable to the deoxidation of iron in the manufacture of vacuum melted alloys such as AISI 52100, 4340 and the various tool steels and magnetic alloys (Si-Fe).

The following is an example of the production of alloy steel by the method of the invention.

PRODUCTION OF A.I.S.I. 3340 STEEL

A mixture of Fe, Ni and Cr containing approximately 3.5% Ni, 1.7 Cr and the remainder iron plus 0.07% C was melted by induction heating in a dynamic partial pressure of 4 mm. pure, dry hydrogen. The hydrogen stream was directed on the surface of the charge and was pumped through the furnace at a rate of 125 c.f.h. When the charge had been melted completely, the pressure was lowered in the chamber by gradually shutting off the hydrogen flow and continuing pumping. When the pressure reached a value of 12 microns and the melt could be frozen and remelted without any visible sign of a C-boil, the C-boil reaction was considered complete. One atmosphere argon was then admitted to the chamber after isolating it from the pumps. C (0.41%), Mn (0.8%) and Si (0.25%) was added to the heat, stirred thoroughly by the induction field, and poured. The increased pressure of argon in this case insures that the Mn (high vapor pressure) is not lost in vacuum at the high iron melting temperature and also that a carbon-boil is not initiated in the mold causing a gassy ingot. The resulting alloy had the following composition:

*Actual Analysis*

| | |
|---|---|
| C—.42 | O—.0002 |
| Mn—.80 | N—.0003 |
| Si—.27 | H—.0000 |
| Ni—3.5 | |
| Cr—1.68 | |
| Fe—Bal. | |

Other modifications and applications of my invention will suggest themselves to those skilled in the art without departing from the spirit of my invention, the scope of which is defined in the following claims.

What I claim as new and desire to secure by Letters Patent of the United States is:

1. A method of deoxidizing iron group metals and their alloys, which contain an excessive amount of oxygen which comprises mixing the same in a crucible with an amount of carbon sufficient to substantially completely deoxidize the metal, heating the mixture to melt the metal and cause the carbon to react with the oxygen contained therein while maintaining a flowing atmosphere of dry hydrogen at subatmospheric pressure over the mixture, the pressure of the hydrogen being maintained only sufficiently high to control the boil so as to minimize splattering, gradually reducing the pressure over the molten metal as the carbon boil reaction reaches completion until high vacuum conditions exist over the melt and holding the molten metal under these conditions until the melt is deoxidized to the desired extent and degasified.

2. The method according to claim 1 wherein the melting is carried out in a refractory oxide crucible which is first washed with a heat of highly deoxidized metal.

3. A method according to claim 1 wherein the dew point of the hydrogen atmosphere is about −100° F.

References Cited by the Examiner

UNITED STATES PATENTS

| | | | |
|---|---|---|---|
| 2,144,200 | 1/39 | Rohn et al. | 75—57 |
| 2,564,498 | 8/51 | Nisbet | 75—49 |
| 2,726,952 | 12/55 | Morgan | 75—49 |
| 2,776,204 | 1/57 | Moore | 75—49 |

BENJAMIN HENKIN, *Primary Examiner.*